US012762497B1

(12) United States Patent
Golhar et al.

(10) Patent No.: US 12,762,497 B1
(45) Date of Patent: Oct. 13, 2026

(54) SYSTEM, METHOD, AND COMPUTER PROGRAM FOR USING GENERATIVE ARTIFICIAL INTELLIGENCE FOR TELECOMMUNICATION OPERATIONS

(71) Applicant: Amdocs Development Limited, Limassol (CY)

(72) Inventors: Rahul Golhar, Wellesley, MA (US); Dhanjeet Singh, Alpharetta, GA (US); Praveen Shukla, Pune (IN); Pallavi Jain, Prosper, TX (US)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 18/774,789

(22) Filed: Jul. 16, 2024

(51) Int. Cl.
*G06Q 10/0639* (2023.01)
*G06N 3/0475* (2023.01)

(52) U.S. Cl.
CPC ....... *G06Q 10/0639* (2013.01); *G06N 3/0475* (2023.01)

(58) Field of Classification Search
CPC ............... G06Q 30/015; G06Q 30/016; G06Q 30/0282; G06Q 10/0639
See application file for complete search history.

(56) References Cited

U.S. PATENT DOCUMENTS

2004/0073641 A1* 4/2004 Minhazuddin ...... H04L 65/1095 709/221
2008/0285474 A1* 11/2008 Seetharaman .......... H04L 65/80 370/252
2015/0220630 A1* 8/2015 Romano ............... G06F 16/345 707/755
2016/0080239 A1* 3/2016 Buenrostro ........... H04L 43/106 709/224
2016/0301579 A1* 10/2016 Djukic ................ H04L 41/5009
2017/0262868 A1* 9/2017 Manjunath ........... G06Q 30/016
2022/0335438 A1* 10/2022 Lessin .................. G06Q 30/016
2022/0365861 A1* 11/2022 DeFilippo .............. G06F 9/547

FOREIGN PATENT DOCUMENTS

CN 115426243 A * 12/2022 ......... H04L 41/0677

OTHER PUBLICATIONS

Maatouk, Ali, et al. "Large language models for telecom: Forthcoming impact on the industry." IEEE Communications Magazine 63.1 (2024): 62-68. (Year: 2024).*

* cited by examiner

*Primary Examiner* — Emmett K. Walsh
(74) *Attorney, Agent, or Firm* — Zilka-Kotab, P.C.

(57) ABSTRACT

As described herein, a system, method, and computer program are provided for using generative artificial intelligence for telecommunication operations. Historical call center data of a particular telecommunications provider is processed by a generative artificial intelligence model to generate at least one analytical report associated with telecommunications operations of the particular telecommunications provider. The at least one analytical report is output.

12 Claims, 5 Drawing Sheets

SYSTEM, METHOD, AND COMPUTER PROGRAM FOR USING GENERATIVE ARTIFICIAL INTELLIGENCE FOR TELECOMMUNICATION OPERATIONS

FIELD OF THE INVENTION

The present invention relates to an analytical tool for telecommunication operations.

BACKGROUND

Currently there exists a critical issue within telecommunication customer service frameworks that is significantly affects customer satisfaction and retention rates. Customer service representatives are currently facing challenges in effectively identifying and aligning the diverse range of telecommunications offerings with the specific needs and contexts of the customers. This disconnect not only undermines the commitment to providing personalized customer experiences but also hampers the ability to optimize customer engagement with telecommunication services.

Compounding this issue is the current, labor-intensive process employed to diagnose and rectify these inefficiencies within customer service operations. This process involves the manual listening to and evaluating many hours of recorded calls to identify issues, a method that is both time-consuming and subject to potential oversight. Such a procedure not only places a significant strain on resources but also delays the implementation of necessary corrective measures, ultimately impacting the ability to swiftly improve service quality and customer experience.

There is thus a need for addressing these and/or other issues associated with the prior art. For example, there is a need to use generative artificial intelligence to improve telecommunication operations.

SUMMARY

As described herein, a system, method, and computer program are provided for using generative artificial intelligence for telecommunication operations. Historical call center data of a particular telecommunications provider is processed by a generative artificial intelligence model to generate at least one analytical report associated with telecommunications operations of the particular telecommunications provider. The at least one analytical report is output.

DETAILED DESCRIPTION

Figure 1:
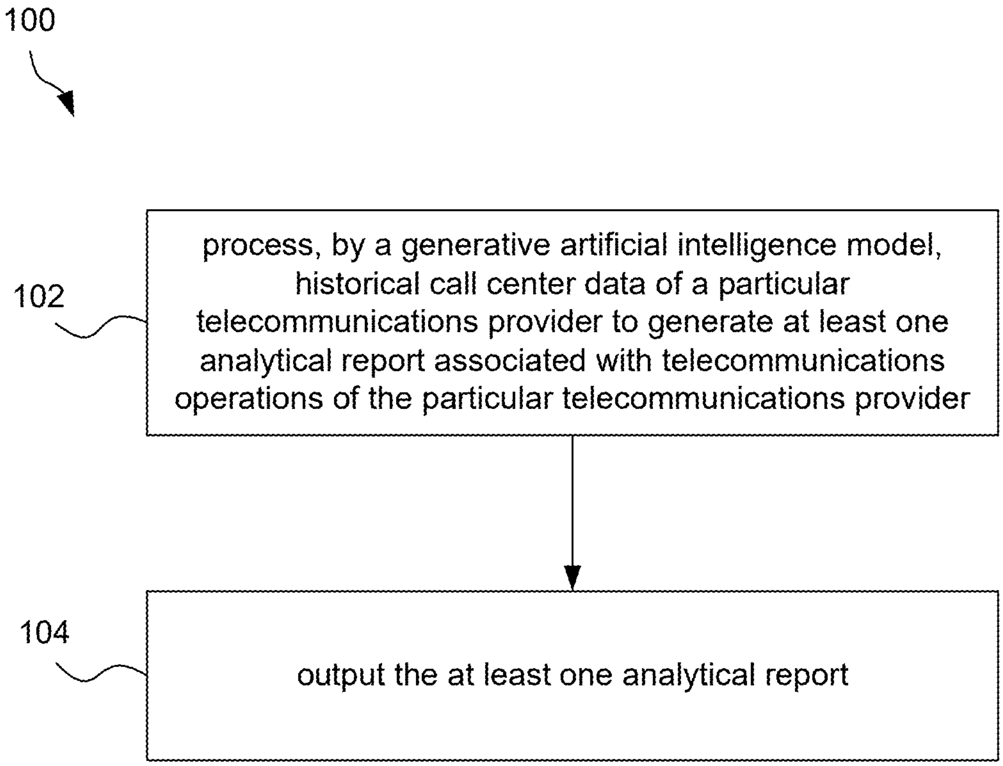
FIG. 1 illustrates a method for using generative artificial intelligence for telecommunication operations, in accordance with one embodiment.

FIG. 1 illustrates a method 100 for using generative artificial intelligence for telecommunication operations, in accordance with one embodiment. The method may be carried out by a computer system, such as that described below with respect to FIGS. 4 and/or 5. In an embodiment, the method 100 may be carried out by a telecommunications provider system. In another embodiment, the method 100 may be carried out by a cloud service shared by a plurality of telecommunications providers. A telecommunications provider refers to an entity (e.g. company) that owns infrastructure over which one or more telecommunications services are provided to customers. The telecommunications provider may also offer products for use with the telecommunications services. The telecommunications services may enable voice, data and/or video transmission between remote entities.

In operation 102, historical call center data of a particular telecommunications provider is processed by a generative artificial intelligence model to generate at least one analytical report associated with telecommunications operations of the particular telecommunications provider. The historical call center data refers to data obtained from a call center of the particular telecommunications provider. In an embodiment, the historical call center data may be call center records. In an embodiment, the historical call center data may include transcripts of prior calls between customers of the particular telecommunications provider and customer service agents of the particular telecommunications provider. In an embodiment, the transcripts may be of dialogs between the customers and the customer service agents during the prior calls.

The generative artificial intelligence model refers to a model trained to generate analytical reports from a given input of call center data. In an embodiment, the generative artificial intelligence model may include a large language model (LLM). In an embodiment, the generative artificial intelligence model may include a generative pre-training transformer (GPT).

In an embodiment, the generative artificial intelligence may refer to a plurality of different models that are configured to perform different generative tasks enabling the generation of at least one analytical report from the given input of call center data. In an embodiment, the generative artificial intelligence model may be configured to process historical call center data defined in a plurality of different spoken languages. In an embodiment, the generative artificial intelligence model may be configured to process historical call center data for calls occurring over a plurality of different communication platforms of the particular telecommunications provider.

In an embodiment, an input prompt may be processed by the generative artificial intelligence model together with the historical call center data to generate the at least one analytical report. In an embodiment, the input prompt may guide the generation of the at least one analytical report from the historical call center data. In an embodiment, the input prompt may be customized for an instance of the processing of the historical call center data by the generative artificial intelligence model. In an embodiment, different input prompts may be used for different instances of the processing of the historical call center data by the generative artificial intelligence model, for example to generate different analytical reports. In an embodiment, the input prompt may be customized by a user.

In an embodiment, the input prompt may indicate a description of the at least one analytical report to be generated by the generative artificial intelligence model. In another embodiment, the input prompt may include an example of the at least one analytical report to be generated by the generative artificial intelligence model. In an embodiment, the input prompt may indicate an output format of the at least one analytical report to be generated by the generative artificial intelligence model.

As mentioned, generative artificial intelligence model processes the historical call center data to specifically generate at least one analytical report associated with telecommunications operations of the particular telecommunications provider. The telecommunications operations refer to any types of business and/or technical operations of the particular telecommunications provider. For example, the telecommunications operations may include processes, flows, policies, interactions, offerings, etc. of the particular telecommunications provider.

The analytical report refers to information indicating a result of an analysis of the historical call center data. In an embodiment, the at least one analytical report may include a qualitative analysis of the telecommunications operations of the particular telecommunications provider. The qualitative analysis may include a recommendation for the customer service agents with regard to various customer emotions to improve customer satisfaction, a measurement of a level of performance of one or more products of the particular telecommunications provider, an indication of issues faced by the customers with respect to the telecommunications operations, a forecast of future customer behaviors and market trends, and/or an indication of gaps in service or knowledge by the customer service agents for training opportunity purposes.

In another embodiment, the at least one analytical report may include a quantitative analysis of the telecommunications operations of the particular telecommunications provider. For example, the quantitative analysis may include potential revenue lost from missed opportunities, actual revenue loss from failed sales conversions, performance metrics, and/or actionable insights.

In operation 104, the at least one analytical report is output. In an embodiment, the at least one analytical report may be output in a user interface for viewing by a user. For example, the at least one analytical report may be visually presented to the user (e.g. in a reports dashboard).

In another embodiment, the at least one analytical report may be output to an application for use in performing some automated function. For example, the at least one analytical report may be output to a call center management application of the particular telecommunications provider for use in routing and prioritizing customer requests. In an embodiment, the at least one analytical report may be output to an automated process that dynamically adjusts network parameters and resource allocation in real-time based on the at least one analytical report, improving service quality and efficiency. In an embodiment, the at least one analytical report may be output to an automated process that integrates the at least one analytical report with network management systems to proactively optimize network performance based on emerging customer issues and usage patterns.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
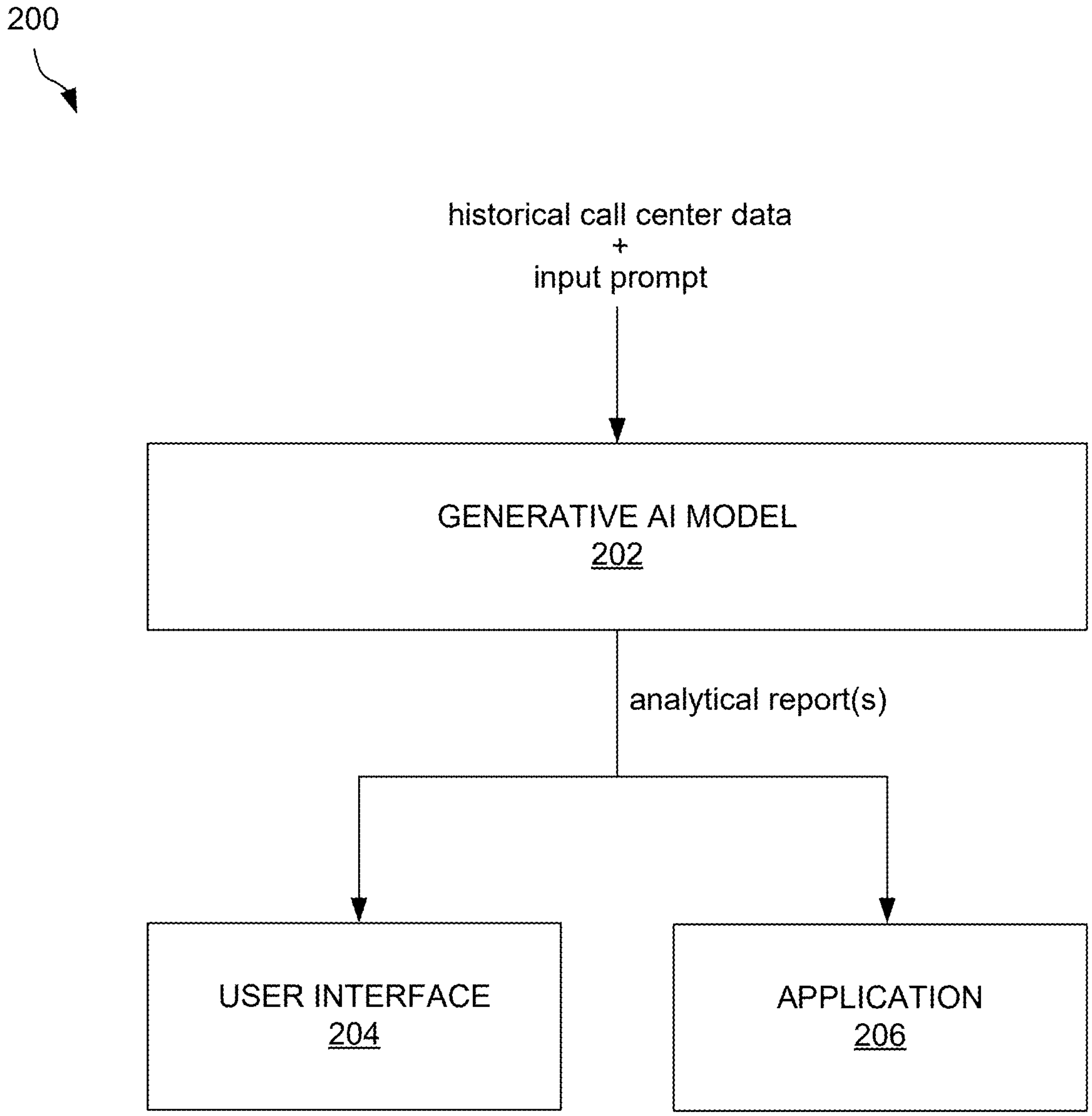
FIG. 2 illustrates a system for using generative artificial intelligence for telecommunication operations, in accordance with one embodiment.

FIG. 2 illustrates a system 200 for using generative artificial intelligence for telecommunication operations, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, historical call center data and an input prompt are provided to a generative artificial intelligence model 202. In an embodiment, the historical call center data may include call center data collected by a call center of a particular telecommunications provider over a user defined, or over a predefined, period of time. In an embodiment, the input prompt may be input, and optionally customized, by a user.

The generative artificial intelligence model 202 processes the historical call center data and the input prompt to generate at least one analytical report associated with telecommunications operations of the particular telecommunications provider. The input prompt includes information that guides the generation of the at least one analytical report by the generative artificial intelligence model 202.

The generative artificial intelligence model 202 outputs the at least one analytical report to a user interface 204 (e.g. dashboard), in an embodiment. In another embodiment, the at least one analytical report to an application 206 for use in performing one or more automated processes. In an embodiment, the application 206 may be a call center management application.

Exemplary Implementation

In an embodiment, the output of a generative artificial intelligence model 202 which analyzes telecommunications customers chat transcripts may be consumed by an automated, adaptive network optimization system (e.g. application 206). This system would use the analytical report(s) to dynamically adjust network parameters and resource allocation in real-time, improving service quality and efficiency.

Key Components of this system include:

(1) Generative AI Analysis Module (e.g. generative artificial intelligence model 202)

(2) Network Parameter Adjustment Engine (3) Resource Allocation Optimizer (4) Predictive Maintenance Scheduler

Workflow

The generative AI Analysis Module analyzes customer chat transcripts in real-time, extracting quantitative and qualitative insights (e.g. artificial intelligence insights).

The adaptive network optimization system processes these artificial intelligence insights to identify: a) Emerging network issues (e.g. slow speeds, dropped calls), b) Changing usage patterns (e.g., increased video streaming), and/or c) Geographic hotspots of problems.

The Network Parameter Adjustment Engine uses this data to automatically fine-tune network settings: a) Adjusting bandwidth allocation, b) Modifying Quality of Service (QoS) parameters, and/or c) Reconfiguring routing protocols.

The Resource Allocation Optimizer dynamically shifts network resources: a) Reallocating spectrum in cellular networks, b) Adjusting cloud computing resources for network functions, and/or c) Modifying content delivery network (CDN) caching strategies.

The Predictive Maintenance Scheduler uses the artificial intelligence insights to: a) Forecast potential equipment failures, b) Schedule preventive maintenance, and/or c) Optimize technician dispatch.

Thus, the system may provide semantic network optimization by using natural language understanding to translate customer-reported issues into specific network adjustments. For example, if multiple customers complain about "choppy video calls," the system can automatically adjust packet prioritization and jitter buffer settings for video traffic in the affected areas.

Example: In a case study, implementing semantic network optimization reduced video call quality complaints by 37% within 24 hours of deployment.

The system may provide predictive load balancing by analyzing chat transcripts for planned events or trending topics, to predict future network load and preemptively adjust resources. This goes beyond traditional reactive load balancing.

Example: When customers discussed an upcoming sports event, AANOM predicted a 250% increase in streaming traffic and proactively increased CDN capacity, resulting in 99.99% uptime during the event compared to 97% uptime for similar past events.

The system may provide adaptive protocol selection, where based on artificial intelligence insights about user behavior and network conditions, the system can dynamically switch between different network protocols to optimize performance.

Example: In areas where customers frequently mentioned slow file transfers, AANOM automatically switched from TCP to QUIC protocol, improving average file transfer speeds by 28%.

The system may provide artificial intelligence-driven spectrum reallocation, including for example for wireless networks where the system can use artificial intelligence insights to dynamically reallocate spectrum based on predicted usage patterns and reported issues.

Example: By analyzing customer complaints about slow data in business districts during work hours, AANOM implemented an AI-driven spectrum reallocation strategy that increased average data speeds by 45% during peak hours.

The system may provide contextual quality of experience (QoE) optimization by using the artificial intelligence to understand the context of customer issues and adjusting network parameters to optimize for specific QoE metrics rather than just raw performance numbers.

Example: When customers in a particular area frequently mentioned issues with online gaming, AANOM optimized for low latency and jitter rather than maximizing bandwidth, reducing gaming-related complaints by 62%.

These innovative applications of generative artificial intelligence insights to network optimization represent a significant advancement over traditional network management systems. By creating a closed loop between customer feedback and network adjustments, the system enables a level of responsiveness and efficiency previously unattainable. The system's ability to understand and act on the semantic content of customer communications, rather than just numerical network metrics, provides improvement over prior art solutions.

Figure 3:
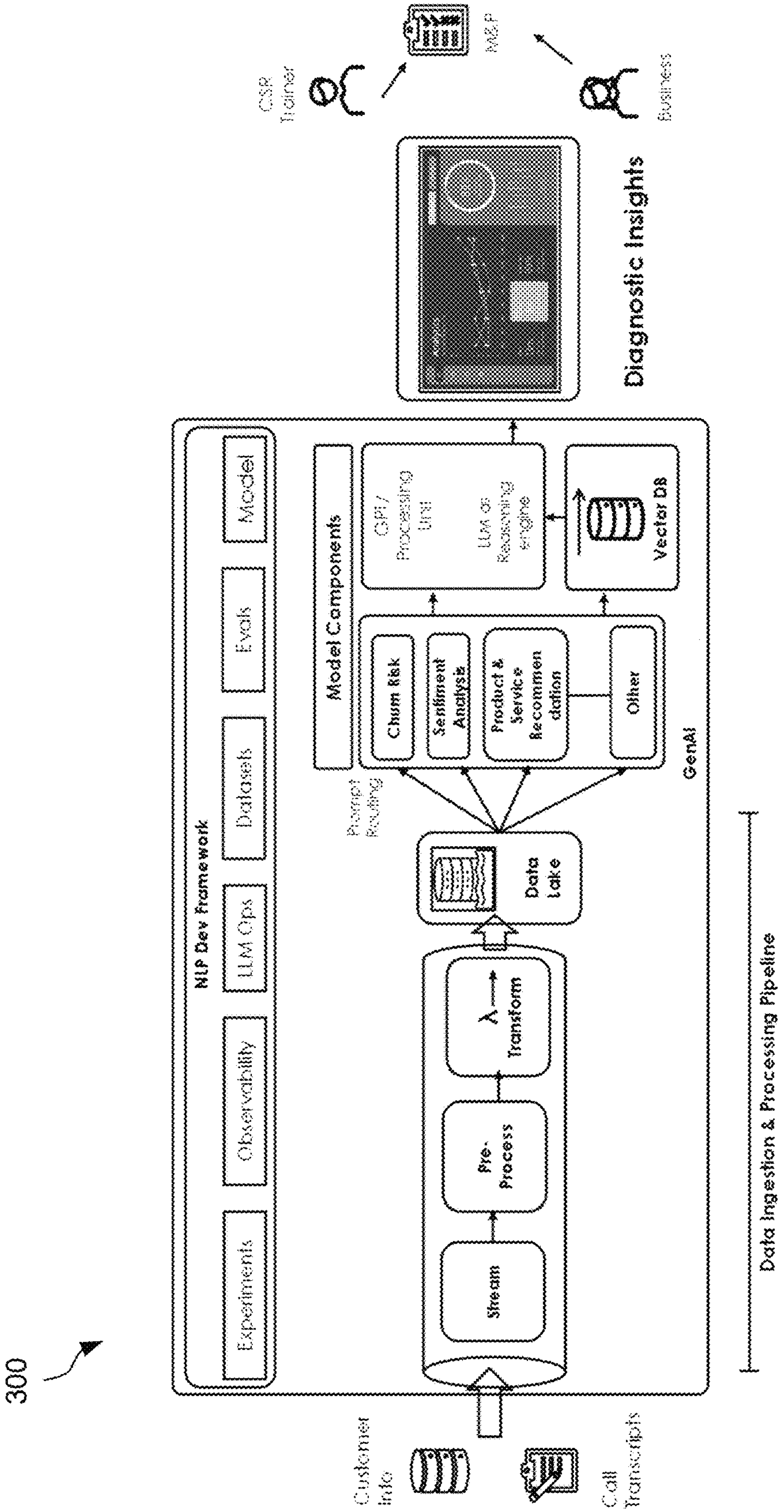
FIG. 3 illustrates a flow diagram for a system that uses generative artificial intelligence for telecommunication operations, in accordance with one embodiment.

FIG. 3 illustrates a flow diagram for a system 300 that uses generative artificial intelligence for telecommunication operations, in accordance with one embodiment. As an option, the system 300 may be implemented in the context of the details of the previous figure and/or any subsequent figure(s). Of course, however, the system 300 may be implemented in the context of any desired environment. Further, the aforementioned definitions may equally apply to the description below.

As shown, customer information and call center transcripts of a telecommunications provider are input to a data ingestion and processing pipeline. The data ingestion and processing pipeline takes the input as a stream, pre-processes the input, and then transforms the input into a format capable of being processed by generative artificial intelligence (shown as Generative AI).

A prompt indicates to the generative artificial intelligence a type of analytical report to generate. The prompt may be transformed (e.g. vectorized) into a format capable of being processed by the generative artificial intelligence, in an embodiment. The generative artificial intelligence is comprised of a GPT unit and an LLM, in the example shown. The generative artificial intelligence processes the transformed input in accordance with the guidance given by the prompt to generate one or more analytical reports.

The one or more analytical reports are output as diagnostic insights associated with telecommunications operations of the telecommunications provider. These diagnostic insights may be reviewed by humans or input to an application for performing some automated process.

The system 300 may improve the way the telecommunications provider analyzes and enhances their product, service, and sales strategies. This system 300, powered by advanced generative artificial intelligence, provides comprehensive analysis of call center transcripts at a granular level and offers valuable recommendations, empowering the telecommunications provider to optimize their operations, stimulate growth, and drive sector-specific advancements.

Embodiments

The system 300 provides targeted recommendations through customized prompts. The essence of the system 300 lies in its ability to provide targeted recommendations, meticulously crafted by leveraging custom prompts that resonate with the telecommunications provider's unique sales and service strategies.

The system 300 fuses quantitative precision and qualitative depth. It provides a robust framework for the telecommunications provider to not only understand their current standing but also to forecast and strategize for the future.

The system 300 can focus on a return of investment (ROI) for the telecommunications provider. It directly boosts revenue through optimized product offerings and superior customer engagement while significantly cutting operational costs by streamlining agent training and performance.

The system 300 provides Qualitative Analysis: The generative artificial intelligence designed for qualitative analysis serves to delve deep into the subtleties and nuances of customer interactions, offering a comprehensive understanding that goes beyond mere numbers, including to:

1. Analyze Sentiments & Coach: By assessing customer sentiments, the generative artificial intelligence can pinpoint the emotional tone and context of each interaction, allowing managers to coach their teams on how to better handle various customer emotions and improve customer satisfaction.

2. Product Sales overall Insights: This feature of the generative artificial intelligence offers a broad view of how each product is performing in terms of sales, providing critical data that can inform product development and marketing strategies.

3. Pain Points Highlights: The generative artificial intelligence is adept at identifying and highlighting the common challenges or issues customers face, enabling the telecommunications provider to address these pain points effectively and enhance the overall customer experience.

4. Forecasting & Planning: By analyzing trends and patterns within the data, the generative artificial intelligence assists in forecasting future customer behaviors and market trends, facilitating more informed strategic planning and resource allocation.

5. Training Opportunities: Identifying gaps in service or knowledge, the generative artificial intelligence pinpoints specific areas where training could significantly improve performance and customer satisfaction.

The system 300 provides Quantitative Analysis: The quantitative analysis aspect of these the generative artificial intelligence provides a solid foundation of metrics and data-driven insights, enabling precise measurement and evaluation of performance and outcomes, including:

1. ROI—Missed Opportunity: This feature calculates the potential revenue lost from missed opportunities, helping the telecommunications provider understand the financial impact of not fully capitalizing on every customer interaction.

2. ROI—Missed Sales: Similar to missed opportunities, this feature quantifies the revenue loss specifically from failed sales conversions. It helps pinpoint the stages in the sales process where customers drop off, providing critical insights for improving sales tactics and closing techniques.

3. Illustrative & Focused Visuals: The generative artificial intelligence provides data visualization capabilities that turn complex datasets into clear, actionable insights through charts, graphs and visual formats.

Additional Features

1. Multilingual Support: The generative artificial intelligence transcends linguistic limitations, offering robust support for a myriad of languages, enabling the telecommunications provider to engage and understand their diverse customer base without the boundaries of language.

2. Omni-Channel Services: By integrating data from an array of communication platforms, the generative artificial intelligence forges a cohesive and omniscient view of customer interactions.

3. Voice Analysis for Security & Risk Compliance: The incorporation of sophisticated voice analysis technology aids in fortifying security measures and ensuring adherence to stringent risk compliance standards.

4. Predictive Analytics in Churn Rate, Services Continuity: Leveraging cutting-edge predictive analytics, this generative artificial intelligence offers foresight into customer behaviors, notably in predicting churn rates and ensuring the continuity of service.

5. Request Routing & Prioritization: The generative artificial intelligence's advanced algorithmic capabilities ensure that customer requests are intelligently routed and prioritized according to urgency, complexity, and customer value.

The implementation of the generative artificial intelligence introduces a suite of strategic business and technical advantages, characterized by enhanced efficiency, optimized resource allocation, and scalability, along with a commitment to accuracy and reliability:

1. Efficiency Enhancement: The generative artificial intelligence dramatically reduces the time required for transcript analysis, lowering it from the traditional 30-60 minutes to an impressively brief 2-3 minutes. This signifies a time efficiency improvement of 93% to 95%, enabling faster decision-making and responsiveness to actionable insights derived from the analysis.

2. Resource Optimization: By integrating the generative artificial intelligence, we significantly optimize our use of human resources, achieving an 80% reduction in the workforce required for oversight. Where previously the analysis of outcomes necessitated 4-5 resources, the tool simplifies process management to such an extent that only one resource is now required to oversee the same outcomes, thereby streamlining operations and decreasing labor costs.

3. Scalable Operations: The generative artificial intelligence ensures 100% scalability, fluently transitioning from processing a single transcript to capably managing hundreds within minutes. This feature is particularly beneficial for businesses with high-volume analysis requirements, offering a solution that can effortlessly scale up to meet increasing demands without compromising on speed or efficiency.

4. Accuracy and Reliability: Despite the rapid processing times and reduced resource requirements, the generative artificial intelligence does not sacrifice quality for efficiency. It consistently delivers exceptionally accurate results, maintaining a reliability rate exceeding 90%. This high level of precision ensures that businesses can trust the insights and analyses provided, enabling them to make more informed decisions based on accurate data. The generative artificial intelligence's robust error-checking algorithms and advanced analytics capabilities play a crucial role in sustaining this accuracy, thereby reinforcing the generative artificial intelligence's value proposition as a reliable solution for transcript analysis.

In summary, the adoption of this advanced analytical system 300 marks a significant leap forward in operational capabilities for any telecommunications provider. By streamlining the time-consuming process of transcript analysis, dramatically reducing the human resources needed for task oversight, offering adaptable scalability, and ensuring a high degree of accuracy and reliability, the system 300 not only enhances operational efficiency but also provides a competitive edge in strategic decision-making. This blend of benefits firmly positions the system 300 as an indispensable asset for telecommunications providers looking to leverage data for actionable insights, optimizing their operations, and driving forward with confidence in their data-driven strategies.

Figure 4:
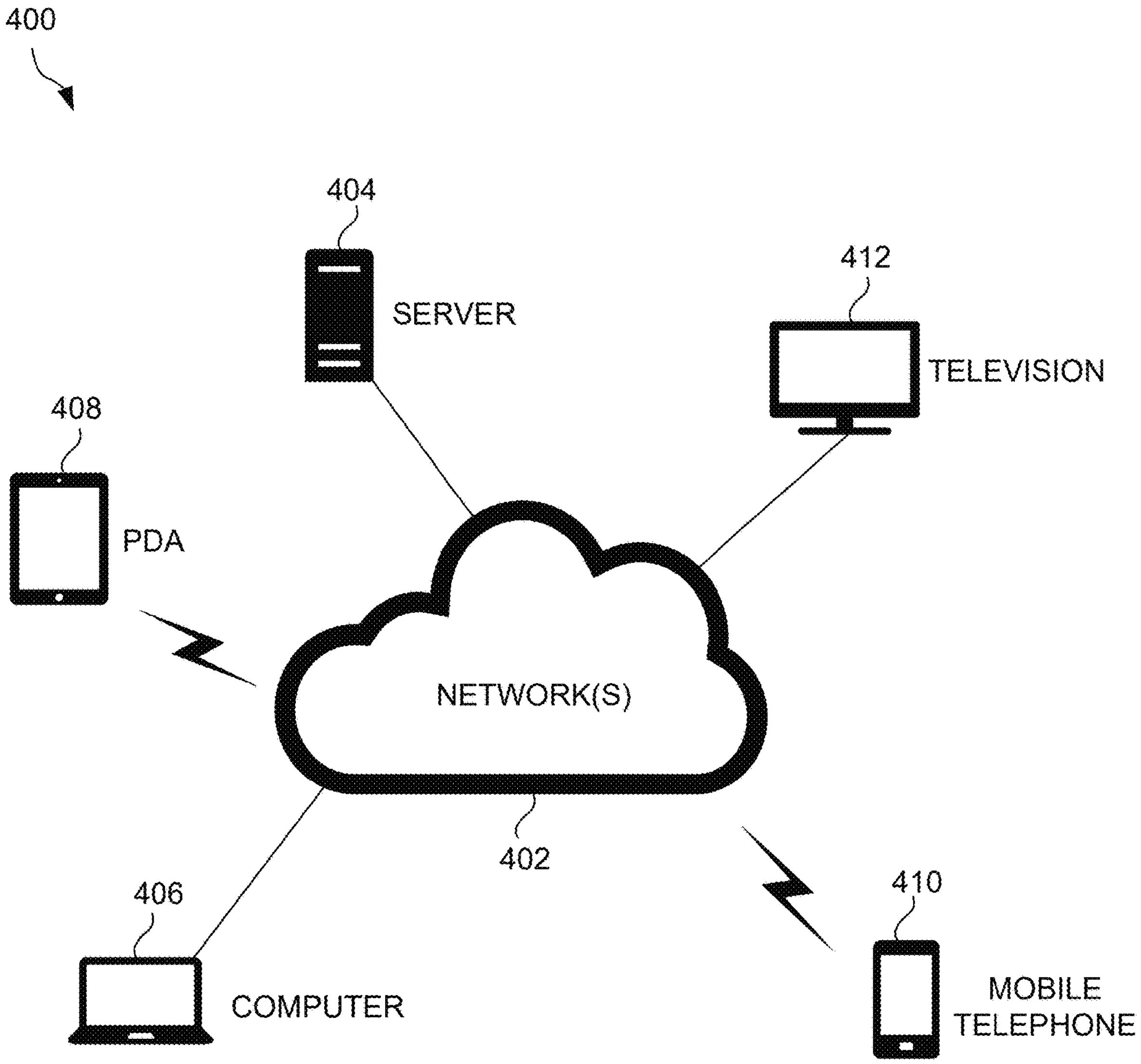
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
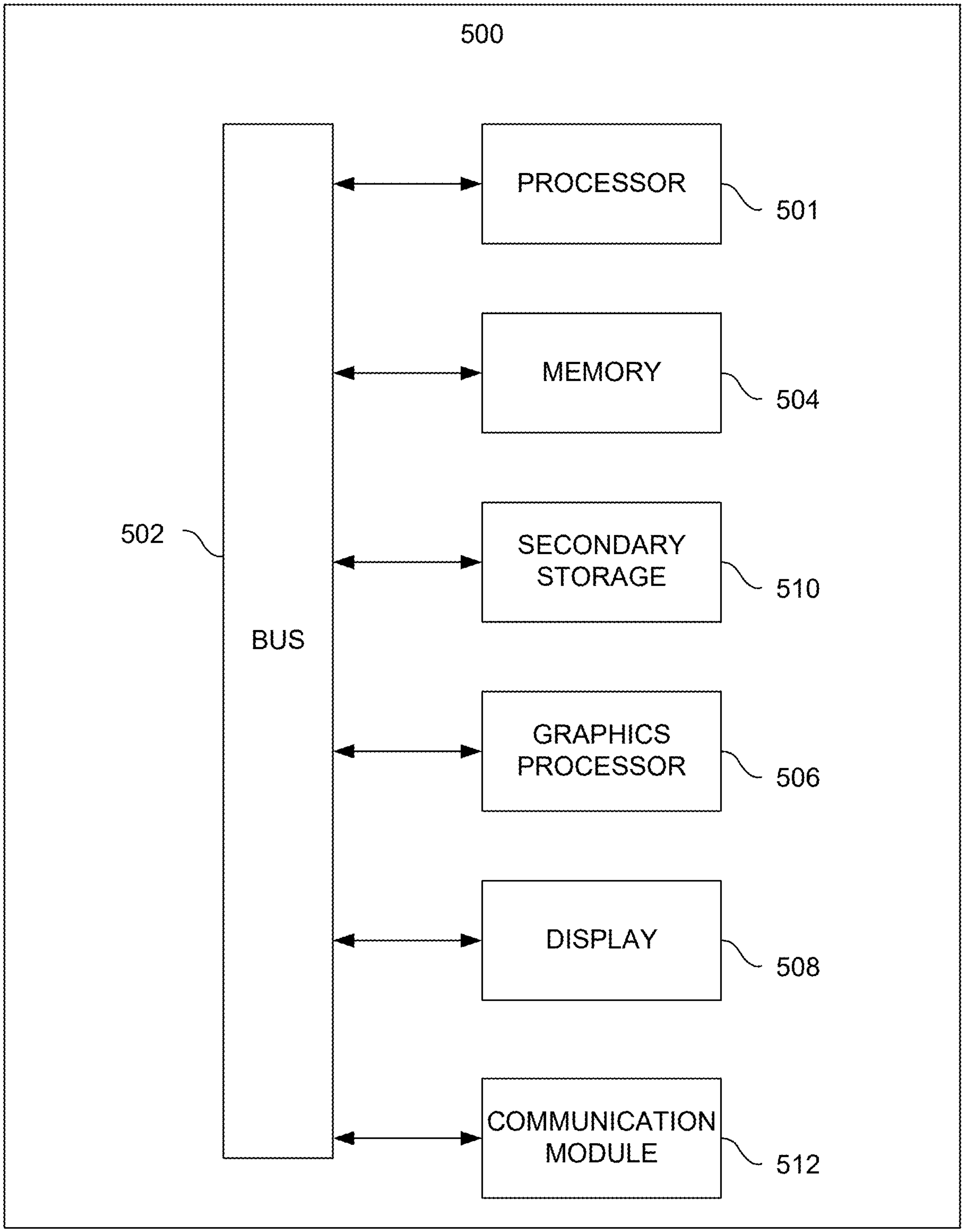
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a “computer-readable medium” includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms “a” and “an” and “the” and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., “such as”) provided herein, is intended merely to better illustrate the subject matter and does not pose a limitation on the scope of the subject matter unless otherwise claimed. The use of the term “based on” and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:

access historical call center data of a particular telecommunications provider, the historical call center data including semantic content of customer communications with a call center of the particular telecommunications provider;

process, by a generative artificial intelligence model, the semantic content of the customer communications with the call center to generate at least one analytical report associated with telecommunications operations within a network of the particular telecommunications provider, the at least one analytical report indicating:

network issues faced by the customers with respect to the telecommunications operations, and changing network usage patterns;

execute an automated process to integrate the at least one analytical report with a plurality of network management systems to proactively optimize network performance based at least in part on the network issues and the changing network usage patterns;

process the at least one analytical report, by a network parameter adjustment engine of the plurality of network management systems, to automatically fine-tune network settings including at least one of:

adjusting bandwidth allocation, modifying quality of service (QoS) parameters, or reconfiguring routing protocols;

process the at least one analytical report, by a resource allocation optimization engine of the plurality of network management systems, to dynamically shift network resources including at least one of:

reallocating spectrum in the network, adjusting cloud computing resources for network functions, or modifying content delivery network (CDN) caching strategies;

process the at least one analytical report, by a predictive maintenance scheduler engine of the plurality of network management systems, to forecast potential equipment failures and at least one of:

schedule preventive maintenance, or optimize technician dispatch.

2. The non-transitory computer-readable media of claim 1, wherein the semantic content includes transcripts of prior calls between customers of the particular telecommunications provider and customer service agents of the particular telecommunications provider.

3. The non-transitory computer-readable media of claim 2, wherein the transcripts are of dialogs between the customers and the customer service agents during the prior calls.

4. The non-transitory computer-readable media of claim 1, wherein an input prompt is processed by the generative artificial intelligence model together with the semantic content to generate the at least one analytical report.

5. The non-transitory computer-readable media of claim 4, wherein the input prompt indicates a description of the at least one analytical report to be generated by the generative artificial intelligence model.

6. The non-transitory computer-readable media of claim 4, wherein the input prompt includes an example of the at least one analytical report to be generated by the generative artificial intelligence model.

7. The non-transitory computer-readable media of claim 4, wherein the input prompt indicates an output format of the at least one analytical report to be generated by the generative artificial intelligence model.

8. The non-transitory computer-readable media of claim 1, wherein the generative artificial intelligence model is configured to process semantic content defined in a plurality of different spoken languages.

9. The non-transitory computer-readable media of claim 1, wherein the generative artificial intelligence model is configured to process semantic content for calls occurring over a plurality of different communication platforms of the particular telecommunications provider.

10. The non-transitory computer-readable media of claim 1, wherein the network issues include one or more of:

slow speeds, or dropped calls.

11. A method, comprising:

at a computer system:

accessing historical call center data of a particular telecommunications provider, the historical call center data including semantic content of customer communications with a call center of the particular telecommunications provider;

processing, by a generative artificial intelligence model, the semantic content of the customer communications with the call center to generate at least one analytical report associated with telecommunications operations within a network of the particular telecommunications provider, the at least one analytical report indicating:

network issues faced by the customers with respect to the telecommunications operations, and changing network usage patterns;

executing an automated process to integrate the at least one analytical report with a plurality of network management systems to proactively optimize network performance based at least in part on the network issues and the changing network usage patterns;

processing the at least one analytical report, by a network parameter adjustment engine of the plurality of network management systems, to automatically fine-tune network settings including at least one of:

adjusting bandwidth allocation, modifying quality of service (QoS) parameters, or reconfiguring routing protocols;

processing the at least one analytical report, by a resource allocation optimization engine of the plurality of network management systems, to dynamically shift network resources including at least one of:

reallocating spectrum in the network, adjusting cloud computing resources for network functions, or modifying content delivery network (CDN) caching strategies;

processing the at least one analytical report, by a predictive maintenance scheduler engine of the plurality of network management systems, to forecast potential equipment failures and at least one of:

schedule preventive maintenance, or optimize technician dispatch.

12. A system, comprising:

a non-transitory memory storing instructions; and one or more processors in communication with the non-transitory memory that execute the instructions to:

access historical call center data of a particular telecommunications provider, the historical call center data including semantic content of customer communications with a call center of the particular telecommunications provider;

process, by a generative artificial intelligence model, the semantic content of the customer communications with the call center to generate at least one analytical report associated with telecommunications operations within a network of the particular telecommunications provider, the at least one analytical report indicating:

network issues faced by the customers with respect to the telecommunications operations, and changing network usage patterns;

execute an automated process to integrate the at least one analytical report with a plurality of network management systems to proactively optimize network performance based at least in part on the network issues and the changing network usage patterns;

process the at least one analytical report, by a network parameter adjustment engine of the plurality of network management systems, to automatically fine-tune network settings including at least one of:

adjusting bandwidth allocation, modifying quality of service (QoS) parameters, or reconfiguring routing protocols;

process the at least one analytical report, by a resource allocation optimization engine of the plurality of network management systems, to dynamically shift network resources including at least one of:

reallocating spectrum in the network, adjusting cloud computing resources for network functions, or modifying content delivery network (CDN) caching strategies;

process the at least one analytical report, by a predictive maintenance scheduler engine of the plurality of network management systems, to forecast potential equipment failures and at least one of:

schedule preventive maintenance, or optimize technician dispatch.

* * * * *